United States Patent
Ricciulli (10) Patent No.: US 6,778,502 B2
(45) Date of Patent: *Aug. 17, 2004

(54) ON-DEMAND OVERLAY ROUTING FOR COMPUTER-BASED COMMUNICATION NETWORKS

(75) Inventor: Livio Ricciulli, Los Gatos, CA (US)

(73) Assignee: Savvis, Inc., DE (US)

( * ) Notice: Subject to any disclaimer, the term of this patent is extended or adjusted under 35 U.S.C. 154(b) by 322 days.

This patent is subject to a terminal disclaimer.

(21) Appl. No.: 09/916,628

(22) Filed: Jul. 27, 2001

(65) Prior Publication Data

US 2002/0018449 A1 Feb. 14, 2002

Related U.S. Application Data (63) Continuation of application No. 09/888,966, filed on Jun. 25, 2001, now Pat. No. 6,473,405, which is a continuation of application No. 09/336,487, filed on Jun. 18, 1999, now Pat. No. 6,275,470.

(51) Int. Cl.$^7$ .............................................. H04L 12/26
(52) U.S. Cl. ...................... 370/238; 370/248; 370/252
(58) Field of Search ................................ 370/238, 248, 370/252

(56) References Cited

U.S. PATENT DOCUMENTS

| | | | |
|---|---|---|---|
| 4,112,488 A | 9/1978 | Smith, III ................... | 364/200 |
| 4,345,116 A | 8/1982 | Ash et al. ................ | 179/18 EA |
| 4,669,113 A | 5/1987 | Ash et al. .................... | 379/221 |
| 4,788,721 A | 11/1988 | Krishnan et al. ........... | 379/221 |
| 4,839,892 A | 6/1989 | Sasaki .......................... | 370/95 |
| 4,905,233 A | 2/1990 | Cain et al. ................. | 370/94.1 |
| 4,985,830 A | 1/1991 | Atac et al. ................... | 364/200 |
| 4,987,536 A | 1/1991 | Humblet ...................... | 364/200 |
| 5,058,105 A | 10/1991 | Mansour et al. .............. | 370/16 |
| 5,088,032 A | 2/1992 | Bosack ........................ | 395/200 |
| 5,115,495 A | 5/1992 | Tsuchiya et al. ............ | 395/200 |

(List continued on next page.)

FOREIGN PATENT DOCUMENTS

| | | |
|---|---|---|
| EP | 0637153 A1 | 7/1993 |
| EP | 0660569 A1 | 12/1993 |
| WO | WO 98/57465 | 12/1998 |

OTHER PUBLICATIONS

A. Chankhunthod et al., "*A Hierarchical Internet Object Cache*", Journal, 1993.
Collins, "*The Detour Framework for Packet Rerouting*", Journal Oct. 29, 1998.

(List continued on next page.)

*Primary Examiner*—Melvin Marcelo
(74) *Attorney, Agent, or Firm*—Davidson Berquist Klima & Jackson, LLP (57) ABSTRACT

Methods and apparatus are disclosed for dynamically discovering and utilizing an optimized network path through overlay routing for the transmission of data. A determination whether to use a default network path or to instead use an alternate data forwarding path through one or more overlay nodes is based on real-time measurement of costs associated with the alternative paths, in response to a user request for transmission of message data to a destination on the network. Cost metrics include delay, throughput, jitter, loss, and security. The system chooses the best path among the default forwarding path and the multiple alternate forwarding paths, and implements appropriate control actions to force data transmission along the chosen path. No modification of established network communication protocols is required.

38 Claims, 5 Drawing Sheets

U.S. PATENT DOCUMENTS

| | | | | |
|---|---|---|---|---|
| 5,128,926 | A | 7/1992 | Perlman et al. | 370/54 |
| 5,218,676 | A | 6/1993 | Ben-Ayed et al. | 395/200 |
| 5,233,604 | A | 8/1993 | Ahmadi et al. | 370/60 |
| 5,253,248 | A | 10/1993 | Dravida et al. | 370/16 |
| 5,321,815 | A | 6/1994 | Bartolanzo, Jr. et al. | 395/200 |
| 5,377,262 | A | 12/1994 | Bales et al. | 379/220 |
| 5,430,729 | A | 7/1995 | Rahnema | 270/94.1 |
| 5,452,294 | A | 9/1995 | Natarajan | 370/54 |
| 5,471,467 | A | 11/1995 | Johann | 370/60 |
| 5,491,690 | A | 2/1996 | Alfonsi et al. | 370/60 |
| 5,519,836 | A | 5/1996 | Gawlick et al. | 395/200 |
| 5,526,414 | A | 6/1996 | Bëdard et al. | 379/221 |
| 5,532,939 | A | 7/1996 | Psinakis et al. | 364/514 |
| 5,559,877 | A | 9/1996 | Ash et al. | 379/221 |
| 5,596,722 | A | 1/1997 | Rahnema | 395/200.15 |
| 5,608,721 | A | 3/1997 | Natarajan et al. | 370/238 |
| 5,721,916 | A | 2/1998 | Pardikar | 395/617 |
| 5,754,790 | A | 5/1998 | France et al. | 395/200.68 |
| 5,774,526 | A | 6/1998 | Propp et al. | 379/90.01 |
| 5,787,271 | A | 7/1998 | Box et al. | 395/500 |
| 5,787,470 | A | 7/1998 | DeSimone et al. | 711/124 |
| 5,790,541 | A | 8/1998 | Patrick et al. | 370/392 |
| 5,802,503 | A | 9/1998 | Sansone | 705/401 |
| 5,854,899 | A | 12/1998 | Callon et al. | 395/200.68 |
| 5,918,021 | A | 6/1999 | Aditya | 395/200.65 |
| 5,922,049 | A | 7/1999 | Radia et al. | 395/200.65 |
| 6,016,307 | A | 1/2000 | Kaplan et al. | |
| 6,185,598 | B1 | 2/2001 | Farber et al. | 709/200 |
| 6,275,470 | B1 * | 8/2001 | Ricciulli | 370/238 |
| 6,473,405 | B2 * | 10/2002 | Ricciulli | 370/238 |
| 6,577,600 | B1 * | 6/2003 | Bare | 370/238 |

OTHER PUBLICATIONS

D. Estrin et al., "*Source Demand Routing: Packet Format and Forwarding Specification (Version 1)*", May 1996, Memo; Internet RFC/STD/FYI/BCP Archives, RFC1940; Network Working Group.

Deborah Estrin et al., "*Source Demand Routing Protocol Specification (Version 1)*", Oct. 10, 1992, Memo; Internet Draft; Network Working Group.

C. Hedrick., "*Routing Information Protocol*", Jun. 1998, Memo, Internet Working Group, Request for Comments: 1058; http://www.cis.ohio–state.edu/cgi–bin/rfc/rfc1058.html.

Savage et al., "*Detour: Informed Internet Routing and Transport*", Jan.–Feb. 1999, IEEE, pp. 50–59.

Segall et al., "QoS Routing Using Alternate Paths", Undated.

Touch, "The X–Bone", USC/Information Sciences Institute, NGI Workshop White Paper—Mar. 1997.

A. Thyagarajan et al., "*Making the Mbone Real*", May 10, 1995, Internet , http://www.isoc.org/HMP/PAPER/227/html/paper.html.

D. Wessels, "*Configuring Hierarchical Squid Caches*", Aug. 19, 1997.

D. Wessels et al., "Internet Cache Protocol (ICP), Version 2", Sep. 1997, Memo; Internet RFC/STD/FYI/BCP Archives, RFC2186; Network Working Group.

D. Wessels et al., "*Application of Internet Cache Protocol* (ICP), Version 2", Sep. 1997, Memo; Internet RFC/STD/FYI/BCP Archives, RFC2187; Network Working Group.

R. Woodburn et al., "*A scheme for an Internet Encapsulation Protocol: Version 1*", Jul. 1991, Internet , http://www.cis.ohio–state.edu/cgi–vin/rfc/rfc1241.html, pp. 1–17.

Guerin R, A., et al., "QOS Routing Mechanisms and OSPF Extensions", Global Telecommunications Conference (Globecom), US, New York, IEEE, Nov. 1997, pp. 1903–1908.

Web Site, "Scaling the Internet," *Inktomi Corp.*, www.inktomi.com, pp. 1–5; likely prior to Jun. 18, 1999.

Web Site, "Are You Akamaized?" *Akamai*, www.akamai.com, 1999, pp. 1–2; likely prior to Jun. 18, 1999.

* cited by examiner

ON-DEMAND OVERLAY ROUTING FOR COMPUTER-BASED COMMUNICATION NETWORKS

RELATED APPLICATION DATA

The present application is a continuation of U.S. patent application Ser. No. 09/888,966 for ON-DEMAND OVERLAY ROUTING FOR COMPUTER-BASED COMMUNICATION NETWORKS filed on Jun. 25, 2001 now U.S. Pat. No. 6,473,405 which is con of U.S. patent application Ser. No. 09/336,487 for ON-DEMAND OVERLAY ROUTING FOR COMPUTER-BASED COMMUNICATION NETWORKS filed on Jun. 18, 1999, now U.S. Pat. No. 6,275,470 the entirety, the entirety of each of these applications is incorporated herein by reference for all purposes.

FIELD OF THE INVENTION

This invention relates to computer networks, and more specifically to a mechanism for finding improved communication paths through a heterogeneous computer network by means of an overlay network.

BACKGROUND AND PRIOR ART

The Internet today consists of a collection of interconnected administrative domains. Each domain is under the control of one or more administrators who decide what hardware equipment to employ and what control software to run. This localized control of the administrative domains requires the coexistence of a number of disparate, heterogeneous systems. The basic communication protocol through which different domains communicate is IP (Internet Protocol). Each Internet data communication is translated into the delivery of a sequence of varying sized IP protocol packets that travel across one or more administrative domains until they reach the final destination.

In IP, the sender of the data only specifies the destination address, whereas the network (the collection of hardware and software systems distributed through several administrative domains) chooses a forwarding path through which to route the IP packets. Routing protocols cooperate across different administrative domains, and through a variety of different software and hardware techniques, to monitor the presence and/or the state of connections in the Internet. Because of the great size and heterogeneous nature of the Internet, and the complexity of the routing task, these routing protocols are typically minimalistic and tend to focus on guarantee of connection and minimizing routing hops rather than optimizing performance. The result, among other problems, is the familiar, frustrating user experience of protracted delay when attempting to access information through the World Wide Web, particularly during periods of heavy usage.

Many proposals to improve the utilization of the Internet exist and feature a wide variety of sophistication and/or response time in changing forwarding paths and thus providing the best routing performance. In practice, these proposals are hardly being used because it is very hard to coordinate their deployment into the Internet. Interoperation among different administrative domains is crucial and any change to the protocols affecting the forwarding paths may greatly affect the availability of connections. As a result, in practice the forwarding paths between endpoints are determined using very simplistic cost functions and/or heuristics and/or manual intervention. This scheme tends to greatly under-utilize the networks. Depending on local configurations, when faults occur, previously chosen forwarding paths that experience a breakage will be followed for several minutes or hours until the fault is remedied or some manual forwarding path reconfiguration occurs.

Several companies, such as Inktomi (Traffic Server product, www.inktomi.com) and Akamai (FreeFlow product, www.akamai.com) are currently offering and/or developing technology for improving Internet communications speeds by mechanisms which essentially replicate or cache copies of frequently-referenced Internet content, and strategically distribute such copies "closer" to the end-user clients who need the information. Such approaches are valuable, but are often limited or ineffective with respect to dynamically generated content (such as cgi-scripted web pages). Moreover, these approaches generally entail significant costs for using large-capacity computer servers to physically store extra copies of massive volumes of data, and for maintaining synchronization among the various repositories of frequently updated content.

What is needed is a mechanism enabling the selection of optimized network paths for the transmission of data, including dynamically generated data, without requiring any change whatsoever to firmly entrenched communication protocols like IP. Furthermore, preferably the mechanism should be essentially transparent to users of the network.

SUMMARY OF THE INVENTION

The present invention provides an on-demand method and system for discovering optimized paths for the transmission of data between source and destination points on a heterogeneous, computer-based communications network. The invention further provides methods and apparatus for transmitting data along such optimized paths, in a transparent manner that does not require modification of existing communication protocols. The data to be transmitted can (but need not) include pages that are dynamically generated in response to an initial request received by the source from the destination, such as an http request to get a cgi-scripted web page.

Briefly, the present invention discloses steps and means, responsive to requests for transmission of data, for measuring a cost of communicating data from the source point to the destination point along a default path, the default path being derived by means of one or more existing routing mechanisms of the communications network. The invention further provides steps and means for measuring the costs of transmitting the message from the source to the destination along one or more non-default, alternative paths passing through a special group of intermediate nodes. In a preferred embodiment, those intermediate nodes are referred to as an "overlay network". An optimized path for sending the requested transmission is ultimately selected by comparing the default cost against the alternative costs.

Further, the present invention discloses steps and means for transmitting messages along an optimized non-default path passing through overlay nodes, including forwarding of the message from the source to a first one of the intermediate overlay nodes, and from a last one of the intermediate nodes to the destination, in a manner that does not require modification of existing network communication protocols. In a further embodiment, the invention includes steps and means for returning a reply to the transmitted message back along the optimized non-default path from the destination to the source.

Note that whenever referring to "optimized" or "optimal" paths throughout this patent, we simply mean paths that are deemed preferable with respect to selected cost/performance criteria and with respect to a set of identified alternative paths. We are not speaking of global optimality.

DETAILED DESCRIPTION OF THE INVENTION

A. Overview

Figure 1:
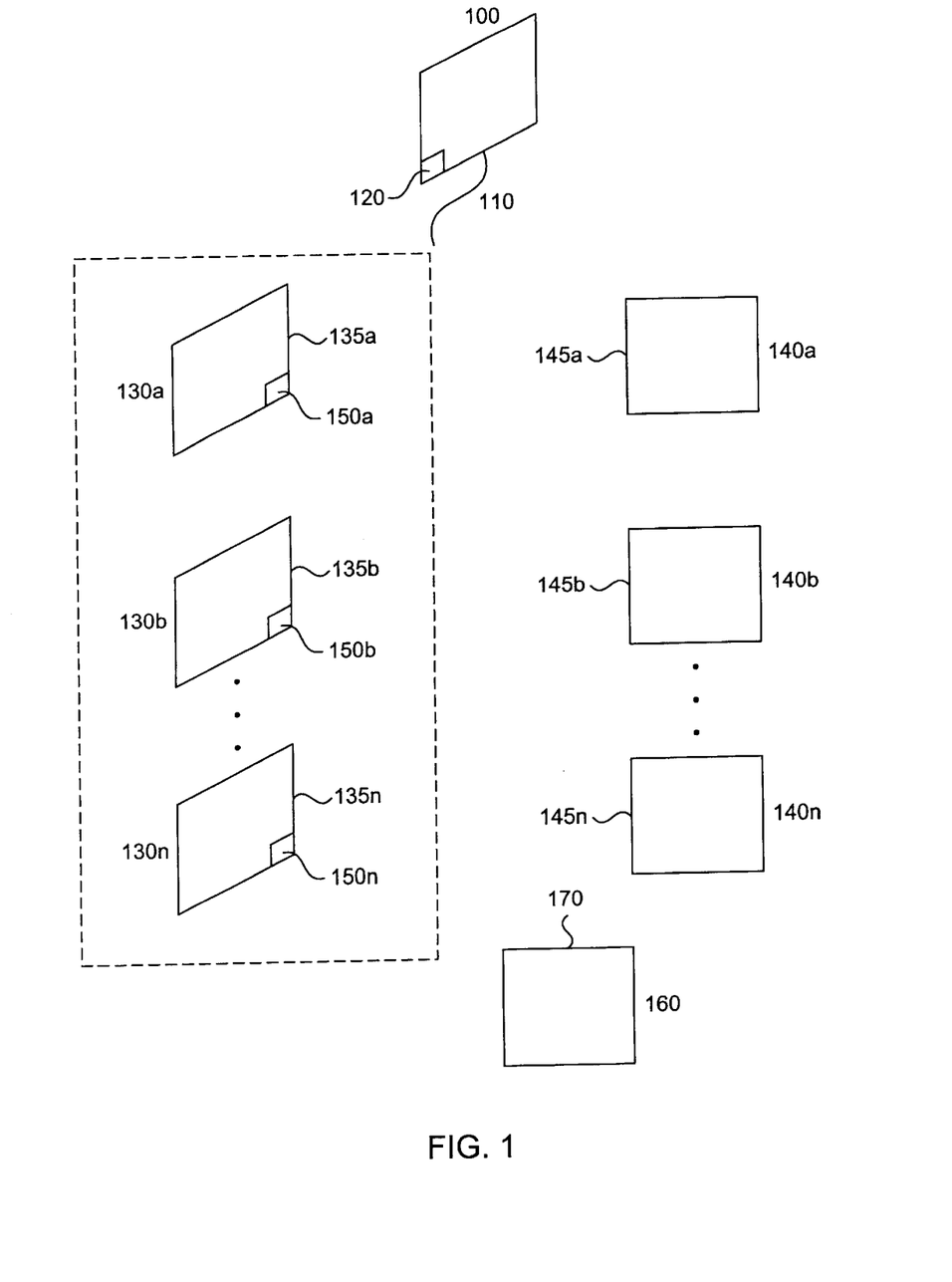
FIG. 1 provides an architectural overview of an overlay network, in a preferred embodiment of the present invention, integrated with a heterogeneous client-server network such as the Internet.

A preferred embodiment of the present invention provides a mechanism for finding and using optimized paths for the transmission of data between source and destination points on a computer network such as the Internet, for example, without requiring any modifications to existing communication protocols. The mechanism preferably combines an overlay routing mechanism with an on-demand routing mechanism, which may be very briefly summarized as follows:

1) An overlay network of alternate routing mechanisms is constructed on top of the existing Internet routing mechanisms to find and exploit available resources. The overlay routing mechanism is completely transparent and separate from the Internet routing protocols and is preferably deployed throughout some small, but widely distributed, portion of the Internet as a distributed user application. FIG. 1 exemplifies the concept. Nodes 100 and 160 are, respectively, source and destination nodes for an intended communication on a network such as the Internet. These nodes are connected to the underlying network via transmission links 110 and 170, respectively. Nodes 140a–n (connected to the underlying network via links 145a–n) represent other network nodes, and might potentially be nodes that are utilized in a default communication path between node 100 and node 170, depending on the routing mechanisms of the network. Overlay network nodes 130a–n utilize existing network transmission lines and infrastructure, via network links 135a–n, to create a virtual topology. The overlay network preferably includes a number of computing devices such as nodes 130a–n that cooperate to provide forwarding paths overlaid over an underlying network. Overlay network nodes preferably communicate using existing, established Internet protocols and thus do not require any modifications to current standards. Each overlay node 130 preferably includes overlay path module 150, and either the source or destination node similarly includes overlay path module 120; these components are programmed and operable to combine available IP protocols in order to provide additional functionality for exploiting overlay routing when it is advantageous to do so, as described below in detail.

In our preferred embodiment, the overlay network includes a set of ordinary computer systems (e.g., Pentium-based PC's) co-located at Internet sites such as major ISP locations. These PC's each include overlay path modules 150 in the form of additional custom software modules, for purposes of the present invention, operable to measure and record connection cost information and optimal forwarding path information, as described in greater detail herein. The overlay network is a virtual network; in other words, although it uses new additional hardware (co-located boxes), it preferably uses the existing network and cabling infrastructure for all communications. Effectively, this overlay network provides a large set of alternate paths with measurable communication costs around the Internet. Clients can use these alternate paths if they are found to provide better service to their desired destinations than would a default path.

2) Alternate, improved forwarding paths through the overlay network nodes are discovered on demand. The process is outlined in the flow diagram of FIG. 2. In step 200, the pertinent process is initiated when a user who is connected to source "A" (i.e., node 100 of FIG. 1) (either directly or indirectly as by way of a network gateway) requests communication of a message to destination B. In response, at step 210, if the threshold cost is exceeded by the default path for the requested communication, then at steps 220–225 (as described in more detail below) overlay path module 120 broadcasts queries which are received and processed by one or more of overlay nodes 130a–n; overlay path modules 150 cooperate to discover alternative paths through overlay nodes 130 and to measure the costs of such alternate paths. Measuring the cost of data transmission along a given path (per steps 210, 220) is generally performed using conventional techniques, depending on the cost metric to be measured. For example, connection delay time can easily be measured by "pinging" the destination of interest from the source node of interest. At steps 230–235 these alternative paths are compared to the existing Internet route or previously chosen overlay routes.

Figure 2:
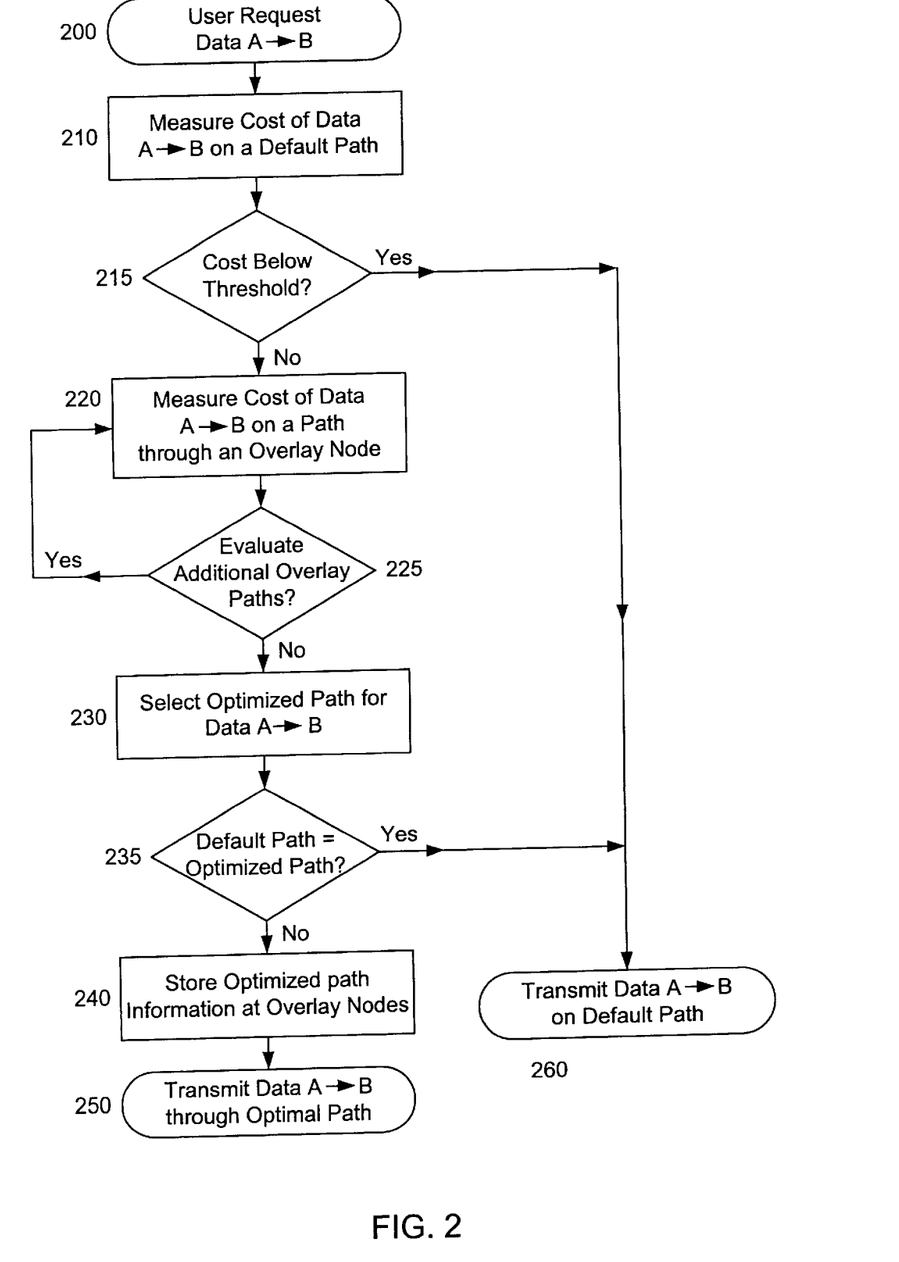
FIG. 2 diagrams the basic series of steps performed in a preferred embodiment of the present invention in order to discover an improved forwarding path for data transmission through one or more overlay nodes, and to transmit the data to its intended destination through the improved path.

3) If a new path is found through the overlay network nodes that has better performance than the default path, at steps 230 and 235, then at step 240 information describing this improved path is preferably sent to each of the overlay network nodes 130 that will be involved in the new path. At step 250, a preferred embodiment of our invention employs a mechanism to route packets through the new path in a transparent manner and without modification of any of the default Internet communication mechanisms. Preferably, a form of IP encapsulation is used, as described below in more detail. The default path is preferably used in step 260, in those cases where no new path is found through the overlay network nodes that has better performance than the default path.

The various processes and structures in a preferred embodiment of the present invention will now be discussed individually in greater detail.

B. On-Demand Discovery of Improved Overlay Forwarding Paths

1. Monitoring

Our invention preferably provides on-demand routing, discovering and adding useful forwarding paths through the overlay network only when needed. This avoids having to pre-compute and record all possible forwarding paths in advance, and advantageously uses the default Internet routing mechanism for bootstrapping and default operations. More particularly, the preferred embodiment of our invention creates a new forwarding path from endpoint A to endpoint B only when: (1) an end-to-end communication is requested between A and B (per step 200 of FIG. 2), and (2) a path id discovered through the overlay routing network that provides better performance than the default Internet route (per steps 210–215 of FIG. 2).

Therefore, the discovery of an overlay forwarding path preferably starts with monitoring one or more cost/performance metrics of interest for the data communications that are carried out on the default Internet routing path. Such monitoring would most typically be performed at a gateway router or the source endpoint, node 100. Module 110 employs a predetermined cost function that combines the monitored metrics and detects end-to-end communications that do not meet specific predetermined requirements. For such communications, the detection process would extract from the monitoring operations (1) the source address A, (2) the destination address B and (3) the cost of the data communication from A to B. Computation of cost information is discussed further below. This information is then used in the process of on-demand forwarding path discovery, as discussed below.

2. Finding an Improved Path

Source node 100 (as well as any of the routers on the default Internet forwarding path) can potentially discover end-to-end communications that do not meet specific requirements. In that event, in order to initiate steps 220–225, module 110 sends a query to the overlay network nodes 130 to determine if the overlay network is capable of offering a better forwarding path. The query is preferably sent to a specified number ("q") of the overlay network routers 130, depending on the configuration. In a relatively simple embodiment, each of the q forwarding path query messages preferably includes: (1) a destination address B, (2) a source address A, and (3) an identifier for a predefined cost function F. In the example illustrated in FIG. 1, source A is node 100, and destination B is node 160. Cost function F is preferably drawn from a set of network communication performance metrics such as delay, throughput, jitter or loss, in accordance with the practitioner's priorities and needs.

When each of the q overlay network nodes 130$i$ receives a forwarding path query, it performs step 220 and measures the assigned cost function F with respect to communications transmitted to destination address B from overlay node, yielding the value F(B,i). F(B,i) is measured for a default network path from the ith overlay node to destination B. In this simple embodiment, the querying node's module 110 receives a single reply from each of the q overlay network routers queried. The querying node at any time during the reception of the replies may decide to pick a particular forwarding path and ignore any additional query replies. In order to pick an optimized forwarding path, the querying node's module 110 preferably combines the F(B) value in each reply with the cost function F(i,A) which measures the cost of communication to overlay node 130$i$ from the querying node, once again along a default network path. As those of skill in the art will appreciate, the combining of cost functions may entail adding values (as where the cost metric is delay) or calculating the minimum value (as for bandwidth), or in general may involve a complex parameterized combination of the cost functions. In any case, at steps 230–235 module 110 preferably uses the computed total costs for the alternative overlay paths and for the default path to select an optimized path for communication between source node 100 (A) and destination node 160 (B).

3. Finding Improved Paths through Multiple Overlay Nodes

In general, for an overlay network with multiple overlay nodes 130$a$–$n$, it may be useful to consider alternative overlay paths that pass through more than one overlay node ("multi-hop paths"). This section describes an alternative, preferred embodiment that includes discovery of multi-hop paths.

Figure 3A:
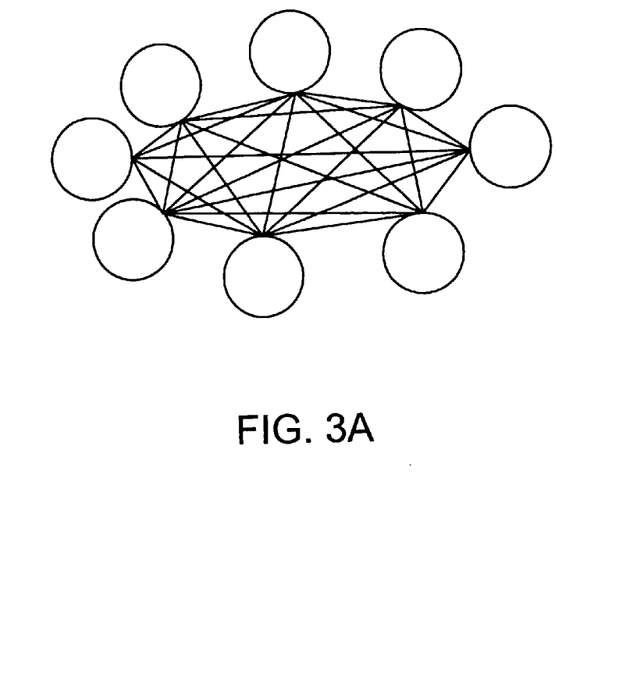
FIG. 3a graphically represents an example of overlay network topology, with full mesh connectivity.
Figure 3B:
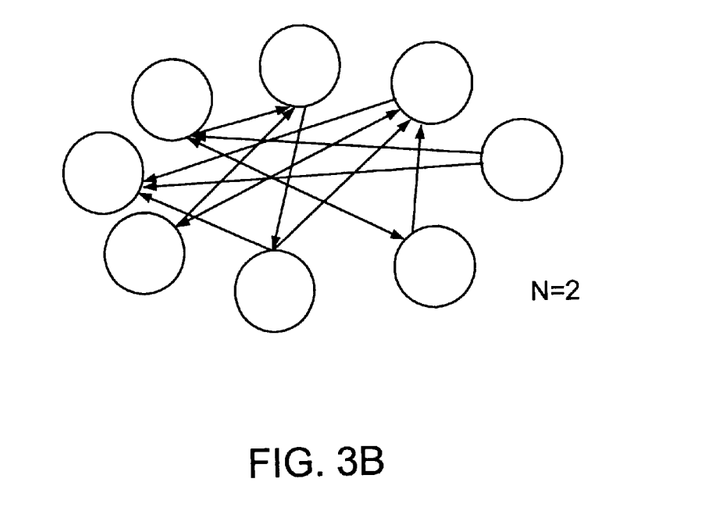
FIG. 3b graphical represents an example of overlay network topology, after pruning in accordance with a preferred embodiment of the present invention.

In principle, an overlay network is capable of logical complete connectivity (in other words, any overlay node can communicate with any other node) through the underlying default Internet routing mechanisms. However, for purposes of multi-hop path discovery, it is generally not computationally worthwhile attempting to exhaustively evaluate the set of all possible multi-hop paths. Therefore, in our preferred embodiment, a topological representation of overlay network connectivity is pruned so as to reduce the number of possible forwarding paths to other overlay nodes from any given overlay node to a fixed, relatively small number ("N"). For example, FIG. 3$a$ illustrates the initial topological representation for an overlay network consisting of 8 nodes with complete connectivity, while FIG. 3$b$ illustrates a pruned topology for the same overlay network, but this time with N=2.

In this alternative preferred embodiment, each overlay node module 150 measures the cost of communication (via the underlying network's default communication paths) to all other overlay router nodes. For each of a given node 130$i$'s neighbors, the cost functions L(j, i) measuring the cost of default communication from overlay node 130$i$ to neighbor overlay node 130$j$ are used for pruning and subsequently for route discovery. In the pruning process, each overlay network node 130$i$ starts with the full connectivity mesh to all other overlay network nodes, and a set of costs L(j,i) associated with the links to each other overlay node 130$j$. The pruning operation preferably consists of two phases. In the first phase, direct links that are more expensive than indirect links are deleted. In the second phase, if there are still more than N direct links from any given overlay node, additional direct links with worst cost functions are pruned. At the end of these two phases each overlay network router has <=N direct link connections, thus satisfying the preferred constraint, and the resulting overall topology of the overlay network may or may not be fully connected. The resulting topology is then used in the subsequent process of alternate path discovery.

The forming of the initial topology and the determination of the final logical topology and associate link costs are preferably performed using the default Internet communication mechanisms. If the overlay nodes are connected to each other by means of specialized or enhanced communication mechanisms—which is by no means required—overlay link costs L(j,i) would be computed on that basis.

Step 225 in conjunction with step 220 of FIG. 2 correspond to the path discovery process in the multi-hop embodiment. In this embodiment, path queries are sent to the overlay network as previously described in the simplified embodiment, but such queries preferably further include a "time-to-live" field ("TTL") that is decremented each time a forwarding path query is received by a node. Just as in the simplified embodiment, at step 220 each overlay node receiving a path query computes a value F(B,i). In addition, however, if the TTL field is non-zero, each overlay node receiving such a query decrements the TTL field and forwards the query to all of its neighbors in the pruned representation of the overlay network logical topology (preferably at most N neighbors, as discussed above). Each such overlay node then replies to the querying node with its own measured F(B,i), and the set of costs L(i,j) for links to each of its topological neighbors.

Figure 4A:
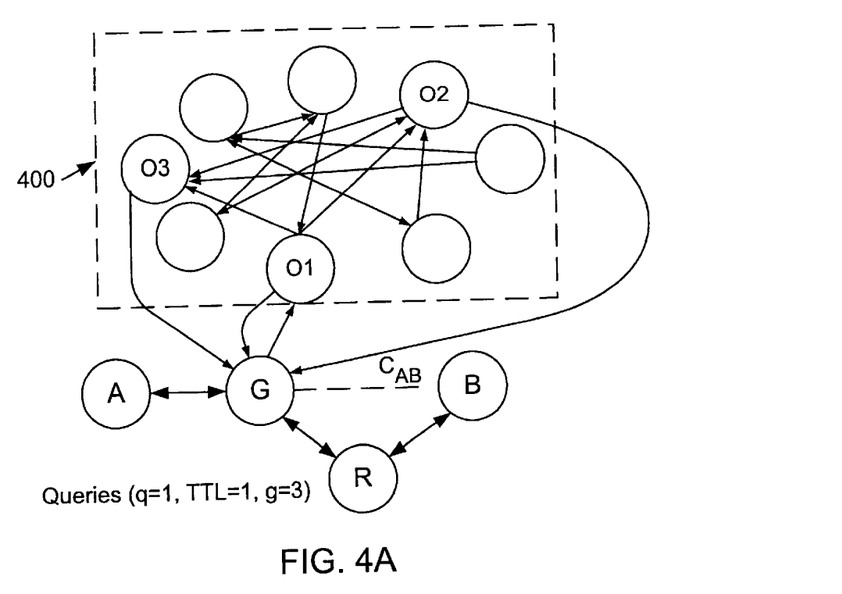
FIG. 4a graphically represents the discovery of an optimized path through overlay nodes for transmitting network data from a source to a destination.
Figure 4B:
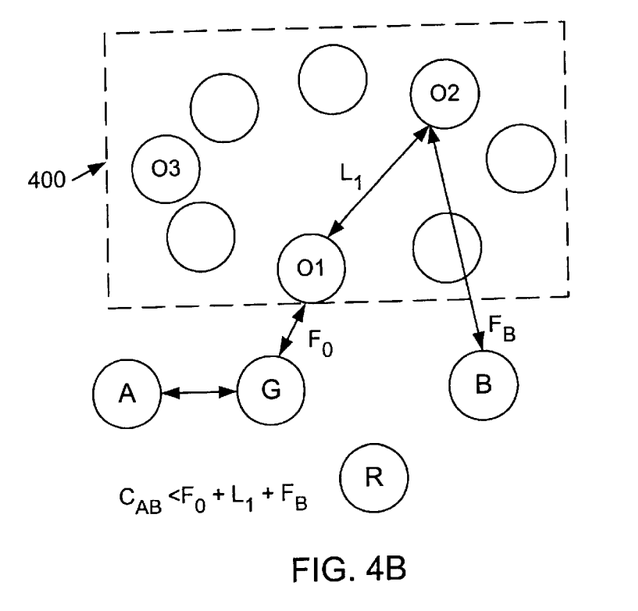
FIG. 4b graphically represents the association of a cost with an optimized path through overlay nodes for transmitting network data from a source to a destination.

In this multi-hop preferred embodiment, in order to compute and compare the relevant total costs for each of the possible overlay forwarding paths at steps 230–235, module 110 of the querying node combines all of the appropriate cost functions. Thus, in the example of FIG. 4a, the ultimate communication path of interest is between gateway node G (through which source node A accesses the network) and destination node B. The cost of the default network path from G to B is represented abstractly by node R, and shown to have total cost C(A,B). FIG. 4a also depicts a pruned topology representation for overlay network 400, as in FIG. 3b, with eight overlay nodes and a connectivity of N=2. As indicated in FIG. 4a, in this example gateway node G sends a single path-discovery query to overlay node O1, and receives a total of three alternate overlay path replies. In FIG. 4b, one such alternate overlay path is the multi-hop forwarding path shown passing from gateway G to overlay node O1 to overlay node O2 and finally to destination B. In that example, the relevant total cost for the alternate overlay path is derived by combining F(O1, G), L(O2, O1), and F(B, O2).

C. Construction and Use of Overlay Forwarding Paths

In the event that an overlay forwarding path is selected at steps 230–235 as the optimized path for sending the user's requested communication, a preferred embodiment of our invention combines existing Internet protocols in an manner that dynamically constructs forwarding paths through the overlay network.

Referring again to FIG. 2, following the detection of an improved overlay forwarding path at steps 230 and 235, information describing the improved forwarding path is stored at step 240 by the originator of the path query (e.g., typically module 110 of source node 100) and by each of the overlay nodes involved in the improved path. The path information is preferably stored at each overlay node 130 in a table or the like, so that when given a specified destination endpoint, an overlay node on the forwarding path can retrieve the address of the next node on the non-default path to whom the message should be forwarded. In a preferred embodiment of our invention, this information may be deleted by the overlay nodes if no end-to-end communication happens between A and B for more than a predefined amount of time, or if the overlay forwarding path's performance is believed to become worse that the default Internet path—or simply after some specified amount of time passes, so that subsequent communication requests will result in discovery and measurement of overlay paths based on the new, current state of the network.

Figure 5:
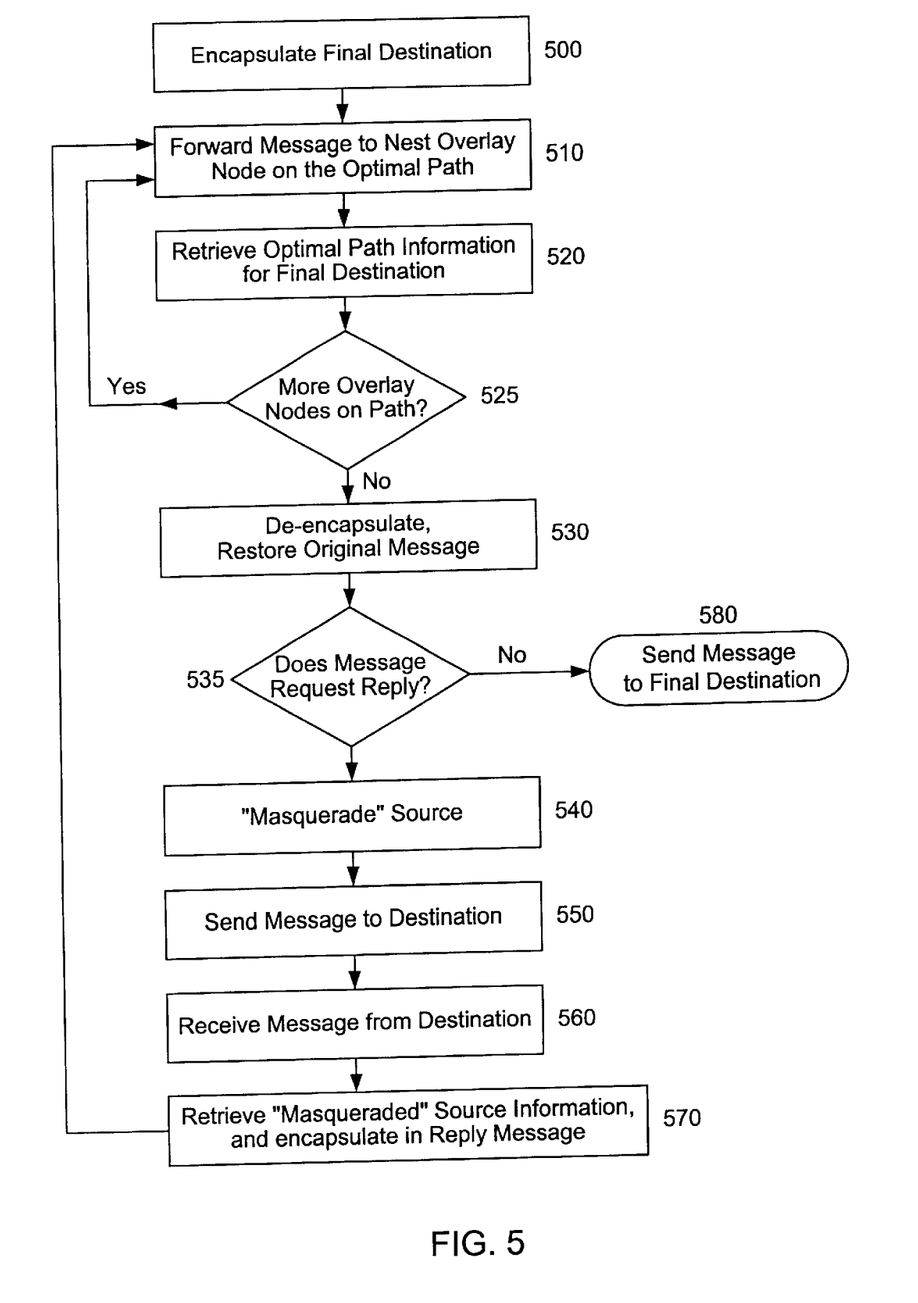
FIG. 5 diagrams the steps performed in a preferred embodiment of the invention in order to transmit data along an optimized forwarding path through one or more overlay network nodes, without modification of existing network routing protocols.

FIG. 5 provides a more detailed view of the method performed to transmit message data through a non-default overlay path (step 250 of FIG. 2), in a preferred embodiment of the present invention. By way of background, message packets in accordance with protocols like the IP protocol generally include "source" and "destination" fields. The "destination" field is used by routing mechanisms in the nodes of the underlying communications network (e.g., the Internet) to forward packets toward their intended destination. In a preferred embodiment of the present invention, a technique called "encapsulation" is a primary mechanism by which our system effectively bypasses default Internet routing and utilizes optimized, alternative forwarding paths through overlay nodes. Encapsulation substitutes an original destination IP address with a different destination IP address, and records the original destination address in an encoded capsule.

For illustration, we will begin with a simple example, in which the message is one-way (no reply), and the alternative overlay path is a one-hop path (i.e., it goes through a single overlay node). In this example, the client at node 100 (or a client connected through gateway node 100 to the network) wishes to send a message on a network such as the Internet to destination node 160. In accordance with a preferred embodiment of the present invention, steps 210–240 are first performed, to discover an optimized overlay path for communicating with 160. Suppose this process determines that, at the present moment, an optimized path for sending a message to 160 (better than the default network path, at any rate) is to send packets from 100 to overlay node 130a, and then to forward them from 130a to 160. In other words, the desired path strategy is to send packets from 100 to 130a using the default network path for 100→130a, and then forward those packets from 130a to 160 using the default network path for 130a→160. At step 250, this transmission is actually carried out, as detailed in FIG. 5. At step 500, overlay software 110 at node 100 addresses the packets to 130a, instead of 160, but also "encapsulates" or encodes the address of 160 in a predetermined format incorporated in the message. The message is then sent to overlay node 130a, at step 510, preferably by means of default network routing mechanisms. When 130a receives the packets, overlay software 150a decodes or de-encapsulates the encapsulated data, and finds the encoded "160" address. At step 520, module 150a of node 130a checks the overlay path information stored earlier at step 240 to identify the next node on the overlay forwarding path. Because, in this example, there are no more overlay nodes on the forwarding path, software 150a proceeds to step 530, and restores the original message with its destination address reset to node 160. Again, because this example involves no reply message, software 150a proceeds to step 580 and simply forwards the packets on to their final destination at node 160. In this way, the original message gets from client (or gateway) 100 to destination node 160, along an optimized non-default path passing through overlay node 130a. This is accomplished without any need to modify the established communications protocols of the underlying network (e.g., IP), and without any modification (or even awareness) of destination node 160.

We next present a further example, involving a multi-hop overlay path; once again, the example treats a one-way communication. In this example, we assume that the process of steps 210–240 discovers an optimized path for transmitting messages from 100 to 160, passing through overlay nodes 130a and 130b. In other words, this time the desired path strategy is to send packets from 100 to 130a using the default network path for 100→130a, then forward those packets from 130a to 130b using the default network path for 130a→130b, and finally to forward those packets from 130b to 160 using the default network path for 130b→160. Once again, at step 500, overlay software 110 at node 100 addresses the packets to 130a, and encapsulates the address of 160. The message is then sent to overlay node 130a, at step 510. When 130a receives the packets, overlay software 150a finds the encoded "160" address, and at step 520, software 150*a* of node 130*a* checks the overlay path information stored earlier at step 240 and identifies overlay node 130*b* as the next node on the overlay forwarding path. Following the flow of FIG. 5, module 150*a* loops back to step 510 and forwards the message to overlay node 130*b*, where module 150*b* performs similar functionality. This time, at step 520, module 150*b* determines that there are no more overlay nodes on the forwarding path, and thereupon (at step 530) restores the original message with its destination address reset to node 160. Because this example again involves no reply message, software 150*b* proceeds to step 580 and forwards the packets on to their final destination at node 160. In this way, the original message gets from client (or gateway) 100 to destination node 160, along an optimized nondefault path passing through overlay nodes 130*a* and 130*b*; and once again, this is accomplished without any need to modify the established communications protocols of the underlying network.

As a third example, we will now consider the case of a message that requests a return reply (such as an http request to get a file), once again in the context of the multi-hop forwarding path through overlay nodes 130*a* and 130*b* as in the previous example. In this scenario, our preferred embodiment operates in the same manner as in the previous example, until module 150*b* reaches step 535 and determines that the message does indeed request a return reply from the destination node 160. Following the flow in FIG. 5, at step 540 module 150*b* "masquerades" source information for the packets. In our preferred embodiment, the last overlay node on a forwarding path performs the task of masquerading, in order to allow bi-directional use of the overlay forwarding path. In the absence of masquerading, the reply sent by node 160 to node 100 would normally follow a return path using default network routing. In general, masquerading replaces the source address of IP packets with the address of the node executing the masquerade, and records enough information locally so as to be able restore the original source address if and when a replay IP packet is returned. In a preferred embodiment and in the context of a network like the Internet, module 150 of a masquerading node locally stores the original source address and the port from which it sent the packet (a port uniquely identifies which connections a node has with any other network node). At step 550, overlay node 135*b* sends the masqueraded message to destination node 160. If and when reply packets are sent from node 160, they will be addressed to overlay node 135*b*, because of the masqueraded source information. When the reply comes back on the appropriate port of node 135*b*, at step 570 module 150*b* retrieves the original source address for node 100 that was previously stored at step 540—which is the true intended destination of the reply message being handled—and constructs a reply message encapsulating the intended destination address of node 100. Returning to step 510, module 150*b* forwards the encapsulated message to the next overlay node on an optimized path to node 100, by accessing path information previously stored at step 240 (in this case, the path information is of course just the inverse of the optimized overlay path for communications being sent from source 100 to destination 160).

In this manner, control and data packets exchanged between source and destination endpoints on a network are advantageously re-routed through an overlay network without any modification of the source or destination nodes (except for the addition of module 110 at the source), and without any modification of the established communication protocols for the underlying network. This transparency is a valuable benefit created by preferred embodiments of the present invention, because it increases the applicability of this approach as a practical solution for legacy network-based applications.

D. Cost Metrics, Applications

There are many potential applications of this invention to practical problems of interest to companies, individuals, and other entities. Cost/performance metrics may be freely chosen as beneficial for desired applications. For example, preferable metrics include delay, throughput, jitter, and loss. Some sample applications will now be discussed.

1. Reliability

Online trading is an Internet application that is assuming a very important role in today's global economy. Real-time trading requires uninterrupted access to the points of sale. A delay of a few minutes in carrying out an order can cost an online trader large amounts of money. In fact it can be argued that the trader with the best and most reliable Internet service will have a definite advantage over others. In this application of our invention we illustrate how dynamic on-demand overlay routing can allow routing around a failure that would otherwise cause the inability to sell or buy shares.

At present, all Internet routing protocols have a built-in mechanism to rebuild routing paths, and therefore ultimately allow detection and reaction to a network fault in appropriate ways. In the default case, a stock trader's ability to carry out orders in the presence of a link failure is dependent on the rerouting capability of its ISP and may greatly vary. Current routing practices typically require anywhere from a minimum of 45 seconds for a localized ad-hoc solution, to a maximum of several hours depending on the particular ISP. The fast, light-weight, on-demand routing capability made possible in accordance with the present invention can potentially reduce the time required for suitable re-routing to less than a few seconds. In a preferred embodiment, when a stock trader pushes a button to enter a trade, the TCP connection delay is passively measured by a rerouting daemon running on the trader's internal network. This measurement is performed with a timeout of 1 second. In case of a link failure the TCP connection measurement would timeout. Immediately after this measurement, our rerouting daemon sends a query to the overlay network specifying its measured connection time (1 second in case of a link failure). If the overlay network is able to find an alternate route to the destination it will return the new route to the rerouting daemon within a few milliseconds. The new route is immediately installed on the stock trader's local network and any subsequent TCP connection requests are forwarded through the newly discovered route rather than the faulty route. This rerouting mechanism has two major advantages for the stock trader: (1) The reaction to finding a new route is reduced from minutes to less than two seconds and (2) the rerouting mechanism is entirely decoupled from his/her ISP configuration and can be independently managed.

2. Bandwidth

The diffusion of multimedia data through the Internet is likely to become much more prominent with the increase of bandwidth to the home. Current bandwidth availability is enough for audio transmission and some low quality video but in the near future, the increase in bandwidth will allow the transmission of full motion video. In addition to the increase of raw bandwidth Quality of Service Routing and other resource allocation protocols (such as RSVP) will allow user applications to acquire a predictable amount of bandwidth in order to guarantee an adequate level of service. The transition of the Internet to using these new protocols is likely to be problematic and diffused over several years.

In this domain, the present invention enables the addition of an additional layer of control on top of the QOS service provided by Internet standards. In this application the overlay network's function is to oversee the resulting performance of the system and its protocols. In this case one can think of an overlay system in accordance with the present invention as a fall-back when the default Internet mechanism does not deliver the necessary quality of service. An overlay routing system in accordance with the present invention can be used to find paths that offer better bandwidth than those provided by the default Internet protocols (either current or future). In this application the end system which is receiving the video can passively monitor the quality of the video being received. A rerouting daemon running on the local network of the user detects that the video quality is poor by measuring the average bit rate consumed by the reception of the video. When the bit rate falls below a certain threshold the routing daemon can query the overlay network for a better path. The overlay network measures the available bit rates that are available through alternate paths and returns the appropriate overlay-forwarding path to the user (if any). The overlay nodes measure the available bit rate of the alternate paths by requesting a video from the video source and measuring the quality of the link. Such requests will be performed using the default Internet protocols and thus do not need to be described here. The overlay nodes requesting the video should be configured to possess the same credentials of the user on whose behalf the rerouting is attempted. In addition to measuring the effective throughput from the video source, the overlay nodes also measure, through the transmission of test packets, the quality of the overlay links to the user. If an overlay forwarding path with better total bandwidth is found, the routing daemon is notified and the video reception is rerouted through the overlay network. In this transition loss of synchronization may occur and the user may experience discontinuity in the viewing; this drawback needs to be considered in allowing the rerouting only when the discomfort of the signal degradation due to loss of bandwidth can be considered greater than the resynchronization discontinuity.

3. Delay

Hyperspace is bringing people together in ways that were unimaginable a few years ago. The many-to-many communication paradigm made possible by the Internet is creating a revolution in how people communicate, do business and spend their leisure time. In many of these revolutionary applications one gets the illusion of interacting with a community of other users in near real-time. As an example of how our system can be used in this context, we describe a video game application in which a user participates in a video game over the Internet. In this application lowering the transmission delay can enhance the quality of the game. In addition, if the game is played by several individuals located at different locations on the Internet, lower delay may also provide an advantage in playing the game because of a faster response time.

A preferred embodiment of the present invention can find overlay forwarding paths that reduce the total transmission delay. In this type of application the measurement of the quality of the end-to-end default-forwarding path is actively carried out. This type of application would most likely run over UDP, which lacks control-signaling messages that can be used to passively measure round trip delays. Furthermore, unlike the video streaming application, no predefined quality of service can be used in assessing the quality of the link.

In this application the routing daemon (located on the user private network) sends test packets to the destination which provoke a reply (for example an ICMP echo packet). The round-trip delay is therefore iteratively measured by the routing daemon in order to assess the delay to the destination. If the delay is measured to be too high (above a predefined threshold) the routing daemon queries the overlay network to see if a lower delay route can be found. If a lower delay route is found the routing daemon seamlessly switches the route to the overlay thus improving the quality of the transmission. In this case the user may or may not experience any discontinuity in the game depending on how the game is implemented.

E. Conclusion, Scope of the Invention

Thus the reader will see that preferred embodiments of on-demand overlay routing in accordance with the present invention can provide a practical, lightweight, economical mechanism for improving network performance. The mechanism is highly transparent, as well, and does not necessitate changes in underlying network protocols such as IP, or in client application programs that rely upon network communications.

While the above description includes many specifics and examples, these should not be construed as limitations on the scope of the invention, but rather as exemplification of a preferred embodiment thereof. Many other variations are possible. For example, while the previous examples were presented in terms of an IP network like the Internet, the present invention is applicable to networking protocols other than IP, and to other network layers and communication protocols including but by no means limited to http, ftp, TCP, and SSL. The invention is applicable as well to packet-switched networks other than the Internet, and to other static-topology networks (whether packet switched or connection-oriented). Also, the same mechanisms can be used where other network properties are optimized (e.g., security), and can be realized with software-only implementations such as by using active networks infrastructure, or other available computational resources).

Accordingly, the scope of the invention should be determined not by the embodiment illustrated, but by the appended claims and their legal equivalents.

What is claimed:

1. A method of sending a packet from a source to a destination on a communications network by employing one or more existing communications protocols on the communications network, the method comprising:

finding that the cost of data transmission along a default path from the source to the destination is greater than the cost of data transmission along an alternate path from the source to destination using one or more nodes not on the default path, wherein the default path is derived by the one or more existing communications protocols of the communications network; and changing a destination address in a destination field of the packet from that specified by the one or more existing communications protocols, in a maimer that causes the packet to travel through along the alternate path, bypassing the default path, while being transmitted on the communications network using the existing communications protocols.

2. The method of claim 1, further comprising specifying the address of the destination in the packet.

3. The method of claim 2, wherein the address of the destination is specified by encapsulating the packet.

4. The method of claim 1, wherein changing the destination address comprises changing the destination address in the destination field of the packet from that of the destination to that of a node on the alternate path.

5. The method of claim 1, wherein the destination address of the destination field of the packet is changed at multiple points along the alternate path to identify successive downstream nodes on the alternative path.

6. The method of claim 1, wherein the existing communications protocol is IP and the IP destination address of the packet is changed.

7. The method of claim 1, wherein nodes of the alternate path comprise a subset of all nodes on an overlay network that resides on top of the communications network.

8. The method of claim 7, further comprising identifying the alternate path among the nodes of the overlay network.

9. The method of claim 7, wherein the overlay network includes a set of computer systems co-located at Internet sites.

10. The method of claim 9, wherein the Internet sites are ISP locations.

11. The method of claim 9, wherein the computer systems are PCs.

12. The method of claim 1, further comprising notifying nodes of the alternate path that they are on the alternate path.

13. The method of claim 1, wherein the cost of data transmission along at least one of the default and the alternate paths is determined from one or more metrics selected from the following group: delay, bandwidth, jitter, loss, security.

14. An apparatus comprising hardware configured to perform a method of sending a packet from a source to a destination on a communications network by employing one or more existing communications protocols on the communications network, the apparatus being configured to perform the following:

finding that the cost of data transmission along a default path from the source to the destination is greater than the cost of data transmission along an alternate path from the source to destination using one or more nodes not on the default path, wherein the default path is derived by the one or more existing communications protocols of the communications network; and changing a destination address in a destination field of the packet from that specified by the one or more existing communications protocols, in a manner that causes the packet to travel through along the alternate path, bypassing the default path, while being transmitted on the communications network using the existing communications protocols.

15. The apparatus of claim 14, further configured to specify the address of the destination in the in the packet.

16. The apparatus of claim 15, wherein apparatus is configured to specify the address of the destination by encapsulating the packet.

17. The apparatus of claim 14, wherein changing the destination address comprises changing the destination address in the destination field of the packet from that of the destination to that of a node on the alternate path.

18. The apparatus of claim 14, wherein the existing communications protocol is IP and wherein the apparatus is configured to change the IP destination address.

19. The apparatus of claim 14, further configured to identify the alternate path among the nodes of an overlay network.

20. The apparatus of claim 14, wherein the apparatus is a computer system co-located at an Internet site.

21. The apparatus of claim 20, wherein the Internet site is an ISP location.

22. The apparatus of claim 14, further configured to notify nodes of the alternate path that they are on the alternate path.

23. The apparatus of claim 14, wherein the cost of data transmission along at least one of the default and the alternate paths is determined from one or more metrics selected from the following group: delay, bandwidth, jitter, loss, security.

24. The apparatus of claim 14, wherein the cost of data transmission along at least one of the default and the alternate paths is determined by a node on the alternate path and wherein the apparatus is configured to receive said cost from said node.

25. The apparatus of claim 14, wherein the apparatus is configured to serve as at least one of an intermediate node or a client.

26. An apparatus comprising one or more software modules for performing a method of sending a packet from a source to a destination on a communications network by employing one or more existing communications protocols on the communications network, the software-implemented method comprising:

finding that the cost of data transmission along a default path from the source to the destination is greater than the cost of data transmission along an alternate path from the source to destination using one or more nodes not on the default path, wherein the default path is derived by the one or more existing communications protocols of the communications network; and changing a destination address in a destination field of the packet from that specified by the one or more existing communications protocols, in a manner that causes the packet to travel through along the alternate path, bypassing the default path, while being transmitted on the communications network using the existing communications protocols.

27. The apparatus of claim 26, the software specifies, when executing, the address of the destination in the in the packet.

28. The apparatus of claim 27, wherein the software specifies, when executing, the address of the destination by encapsulating the packet.

29. The apparatus of claim 26, wherein changing the destination address comprises changing the destination address in the destination field of the packet from that of the destination to that of a node on the alternate path.

30. The apparatus of claim 26, wherein the existing communications protocol is IP and wherein the software changes the IP destination address, when executing.

31. The apparatus of claim 26, wherein the software comprises a component for identifying the alternate path among the nodes of an overlay network, when executing.

32. The apparatus of claim 26, wherein the apparatus is a computer system co-located at an Internet site.

33. The apparatus of claim 26, software comprises a component to notify nodes of the alternate path that they are on the alternate path.

34. A method for selecting a route in a network, the method comprising:

receiving data associated with a request for content at a first intermediate server, the data transmitted from an end user to the first intermediate server;

identifying a first cost of transmission along a default route from the first intermediate server to a content server, the default route determined using one or more existing Internet Protocol routing mechanisms;

identifying a second cost of transmission along an alternate route from the first intermediate server to the content server, the alternate route including a second intermediate server not in the default route, wherein the second intermediate server is part of an overlay network;

determining an optimal route based at least in part on the first cost and the second cost, wherein the first cost and the second cost are determined using network communication performance metrics; and transmitting data associated with the request for content along the optimal route.

35. The method of claim 34, wherein network communication performance metrics are obtained periodically.

36. The method of claim 35, wherein the cost of transmission is determined using one or more network communication performance metrics selected from the following group: delay, bandwidth, jitter, loss, security.

37. The method of claim 34, wherein the alternate route comprises one or more overlay nodes.

38. The method of claim 37, wherein the one or more overlay nodes define a virtual topology.

* * * * *